US009661866B2

(12) United States Patent
Swartz

(10) Patent No.: US 9,661,866 B2
(45) Date of Patent: May 30, 2017

(54) CONFECTION EXTRACTOR APPARATUS AND METHOD

(71) Applicant: Kent Swartz, Castle Rock, CO (US)

(72) Inventor: Kent Swartz, Castle Rock, CO (US)

( * ) Notice: Subject to any disclaimer, the term of this patent is extended or adjusted under 35 U.S.C. 154(b) by 10 days.

(21) Appl. No.: 14/806,090

(22) Filed: Jul. 22, 2015

(65) Prior Publication Data

US 2016/0037799 A1    Feb. 11, 2016

Related U.S. Application Data

(60) Provisional application No. 62/027,528, filed on Jul. 22, 2014.

(51) Int. Cl.
| | | |
|---|---|---|
| *B66C 1/42* | (2006.01) |
| *A23G 9/22* | (2006.01) |
| *A23G 9/48* | (2006.01) |
| *A23G 3/34* | (2006.01) |
| *A23G 3/56* | (2006.01) |
| *A23G 9/26* | (2006.01) |
| *A23G 9/50* | (2006.01) |

(52) U.S. Cl.
CPC ........... *A23G 9/221* (2013.01); *A23G 3/0031* (2013.01); *A23G 3/563* (2013.01); *A23G 9/26* (2013.01); *A23G 9/48* (2013.01); *A23G 9/503* (2013.01)

(58) Field of Classification Search
CPC .......... A23G 9/221; A23G 9/48; B65D 71/50; B65D 67/02; B25J 15/0052
USPC ... 294/87.1, 87.11, 87.22, 87.24, 87.26, 162, 294/163, 99.1
See application file for complete search history.

(56) References Cited

U.S. PATENT DOCUMENTS

| 1,652,597 | A | * | 12/1927 | Ayers | ...................... | B08B 9/426 |
| | | | | | | 198/803.15 |
| 2,230,525 | A | | 12/1937 | Chilton | | |
| 2,198,528 | A | * | 4/1940 | Cutting | .................. | A23G 9/265 |
| | | | | | | 294/87.11 |
| 2,355,004 | A | * | 8/1944 | McCulloch | ............. | B65B 21/18 |
| | | | | | | 294/87.24 |
| 2,377,364 | A | * | 6/1945 | Overland | ............... | A23G 9/265 |
| | | | | | | 294/87.11 |
| 2,461,844 | A | * | 2/1949 | Overland | ............. | A23G 7/0031 |
| | | | | | | 294/87.11 |
| 2,463,916 | A | * | 3/1949 | Smola | .................... | B65D 67/02 |
| | | | | | | 294/87.24 |
| 2,520,203 | A | * | 8/1950 | Haywa | ................... | B65D 71/50 |
| | | | | | | 220/23.4 |
| 2,558,182 | A | * | 6/1951 | Killingsworth | ........ | B65D 71/50 |
| | | | | | | 211/74 |
| 3,743,234 | A | | 7/1973 | Pietrzak | | |

(Continued)

OTHER PUBLICATIONS

International Search Report and Written Opinion of the International Searching Authority, or the Declaration in corresponding application PCT/US15/41548 dated Jul. 22, 2015.

*Primary Examiner* — Gabriela Puig
(74) *Attorney, Agent, or Firm* — Locke Lord LLP

(57) ABSTRACT

An apparatus for engaging and releasably retaining a fragile or brittle food product for forming a confection on the food product. The apparatus comprising an elastomeric grommet having a radially flexible body defining an aperture having an open position for receiving the food product and a closed position for engaging and releasably retaining the food product.

8 Claims, 8 Drawing Sheets

(56) References Cited

U.S. PATENT DOCUMENTS

| | | | | |
|---|---|---|---|---|
| 4,288,904 A | * | 9/1981 | Lindberg | B02C 13/26 |
| | | | | 241/194 |
| 4,341,067 A | * | 7/1982 | Kondo | D01H 9/001 |
| | | | | 294/103.1 |
| 4,395,069 A | * | 7/1983 | Lebret | B65B 21/12 |
| | | | | 294/116 |
| 4,807,917 A | * | 2/1989 | Bunting | B65B 21/18 |
| | | | | 294/118 |
| 6,241,448 B1 | * | 6/2001 | Nicholas | C03B 9/447 |
| | | | | 294/118 |
| 6,371,717 B1 | * | 4/2002 | Grams | B25J 15/0052 |
| | | | | 294/81.61 |
| 2004/0036004 A1 | | 2/2004 | De Groote | |
| 2004/0076727 A1 | | 4/2004 | L'Hommedieu | |
| 2011/0167836 A1 | | 7/2011 | Zorovich et al. | |
| 2014/0127367 A1 | | 5/2014 | Wolf et al. | |

\* cited by examiner

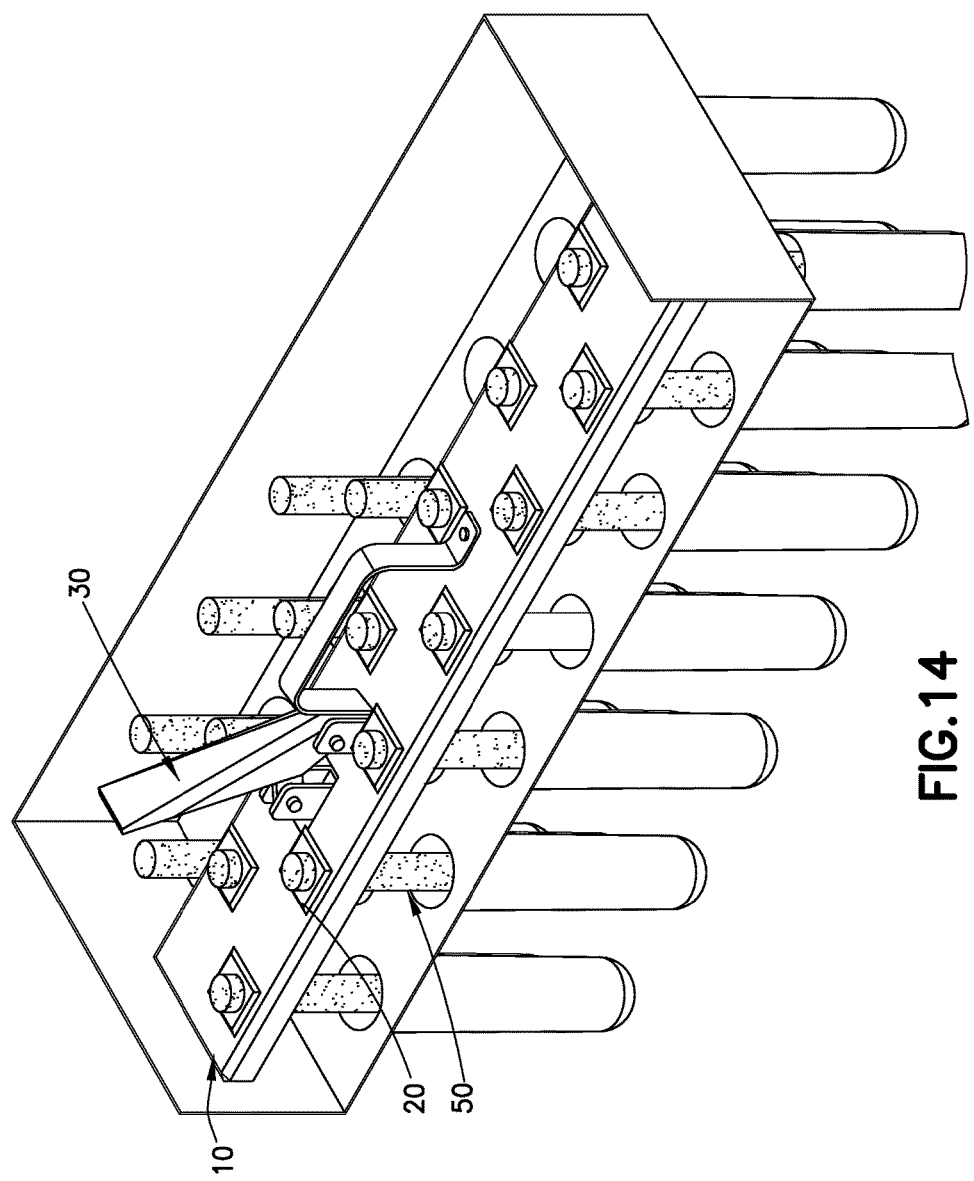

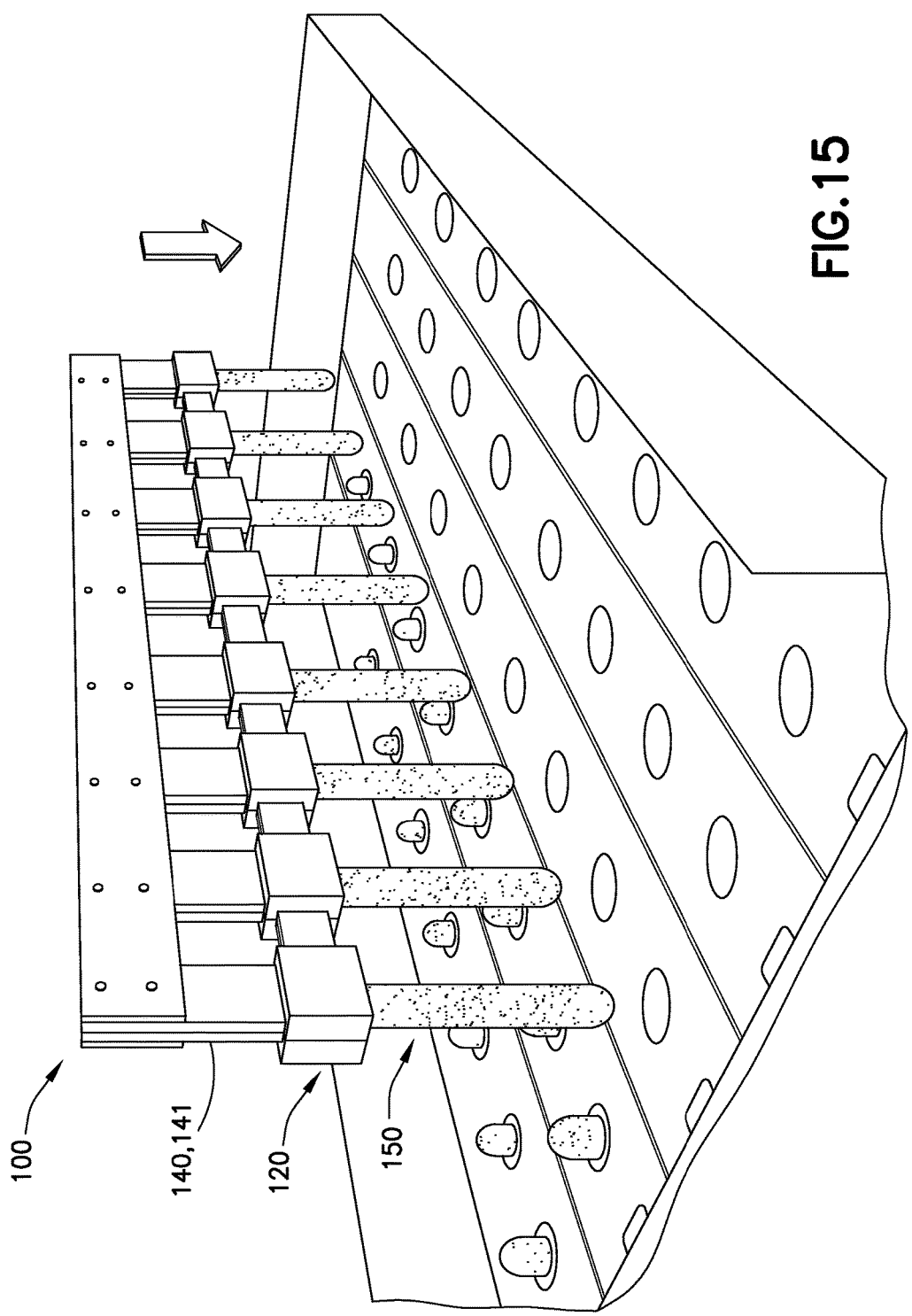

CONFECTION EXTRACTOR APPARATUS AND METHOD

CROSS REFERENCE TO RELATED APPLICATION

The present application claims the benefit of and priority under 35 U.S.C. §119(e) to U.S. Provisional Application Ser. No. 62/027,528, filed Jul. 22, 2014, entitled Confection Extractor Apparatus And Method, and being full incorporated herein by reference.

FIELD OF THE INVENTION

The present invention relates to an extractor assembly for manufacturing a confection product. More specifically, the present invention relates to an extractor assembly configured to receive, grip, and release a fragile or brittle biscuit, bread, cookie or candy product for the manufacture of a confection product.

BACKGROUND

Various manual and automated production systems for manufacturing confection products have involved an extractor assembly with a clamping mechanism designed to apply a direct compression force to secure a rigid and generally incompressible wooden or plastic stick. For example, various automated confection molding machines have been used for manufacturing frozen confections formed on a stick, such as an ice cream bar. Such molding machines generally utilize a plurality of mold cups that are filled with a confection product. The molding machines also include an extractor assembly configured to receive and grip a plurality of rigid sticks. The extractor assembly is further configured such that each of the sticks is inserted into a corresponding mold cup. The mold cups are then cooled to freeze the confection, forming a frozen confection on a stick.

SUMMARY OF THE INVENTION

It is an object of the present invention to provide an apparatus configured to selectively receive, grip, and release an fragile or brittle food product such as a biscuit, bread, cookie or candy product for the manufacture of a confection product.

It is a further object of the present invention to implement an apparatus configured to selectively receive, grip, and release a fragile or brittle food product such as a biscuit, bread, cookie or candy product in an automated system for manufacturing confection products.

It is a further object of the present invention to provide an apparatus configured to selectively receive, grip, and release a fragile or brittle food product such as a biscuit, bread, cookie or candy product for the manufacture of a frozen confection product where the edible brittle biscuit, bread, cookie or candy product functions as a stick for holding the frozen confection product.

It is a still further object of the present invention to provide a relatively light weight apparatus configured to selectively receive, grip, and release a fragile or brittle food product such as a biscuit, bread, cookie or candy product for manufacturing confection products.

DESCRIPTION OF DRAWINGS

These and other aspects of the invention will be described with reference to the drawings, in which:

FIG. 14 is a perspective view of the extractor assembly and grommet embodiment shown in FIG. 1 and in use with a mold for making confection products;

FIG. 15 is a perspective view of an embodiment of an extractor assembly in an automated production system according to the present invention;

DETAILED DESCRIPTION OF THE INVENTION

The present disclosure can provide a number of advantages depending on the particular aspect, embodiment, and/or configuration. These and other advantages will be apparent from the disclosure. Reference will now be made in detail to various embodiments of the present invention, examples of which are illustrated in the accompanying drawings.

Figure 1:
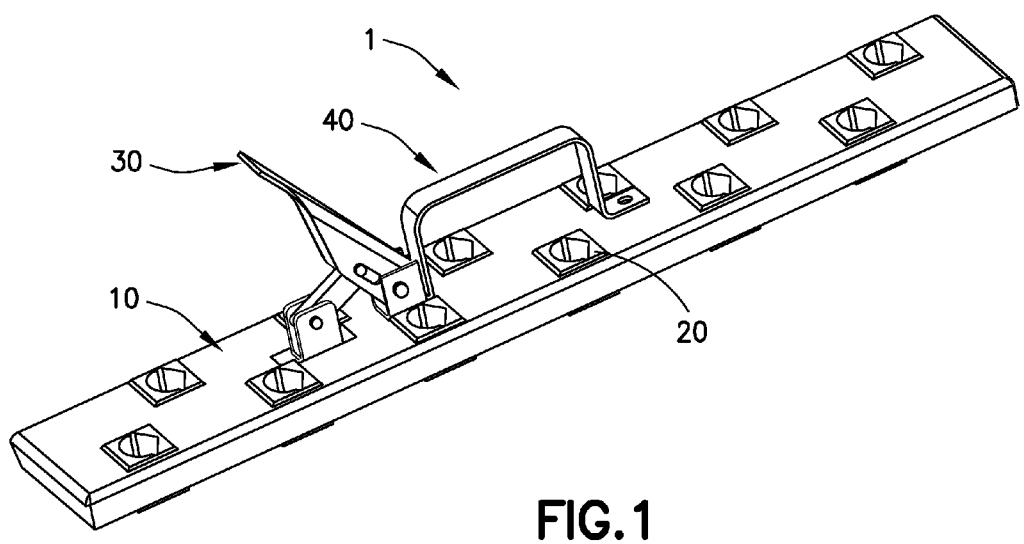
FIG. 1 is a perspective view of a manually operated extractor assembly according to an embodiment of the present invention.
Figure 2:
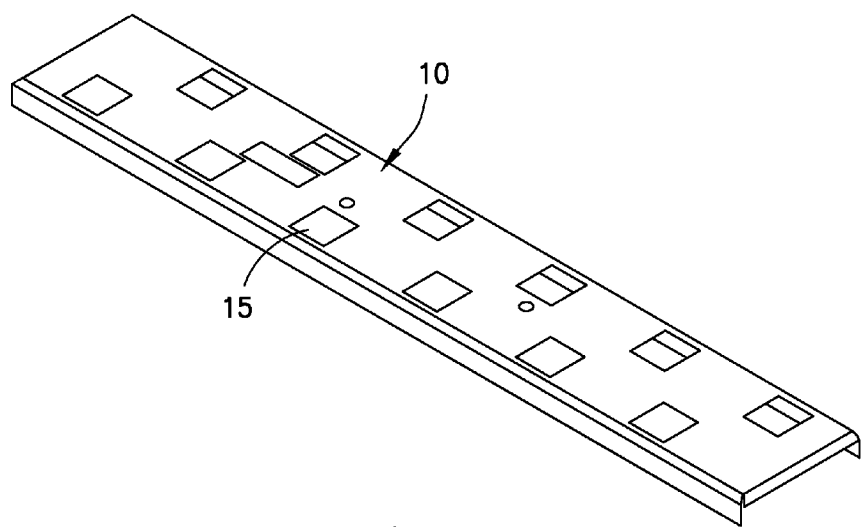
FIG. 2 is a perspective view of the top plate member of the extractor assembly embodiment shown in FIG. 1.

According to one embodiment, the present invention may be implemented in a manually operated extractor assembly as illustrated in FIGS. 1-14. As shown in FIGS. 1 and 2, this embodiment of the present invention comprises an extractor assembly 1 having a plurality of openings 15 each of which is dimensioned to receive an elastomeric grommet 20. The extractor assembly further includes a handle 40 and a manually-operated lever 30. The manually-operated lever 30 is movable between an open position and a closed position, and is coupled to an internal clamping mechanism having a sliding metal tab (not shown) configured to selectively apply a transverse force to each of the elastomeric grommets 20 when lever 30 is moved to the closed position.

The extractor assembly 1 of the present invention is designed for use with a fragile or brittle food product such as a biscuit, bread, cookie or candy product. Due to the fragile nature of such products, the present invention employs a elastomeric grommet 20 configured to apply a transverse force exerted by the internal clamping mechanism as a compression force to securely grip the brittle product without deforming, crushing or otherwise damaging the brittle product. Preferably, grommet 20 comprises an FDA-compliant food grade elastomeric material such as rubber, urethane, or silicone. In a preferred embodiment, grommet 20 is formed of QM 122 food grade silicone material manufactured by Quantum Silicones.

It will be understood that the acceptable range of compression force applied by the grommet 20 to securely grip the brittle food product without deforming, crushing or otherwise damaging the product will vary depending on the physical properties of the brittle product. For example, it has been found that compression forces ranging from about 1.5 psi to 25 psi can be used to securely grip a standard pretzel rod having a round cross-section, without deforming, crushing or otherwise damaging the pretzel rod. More specifically, it has been found that a compression force as little as about 1.5 psi to 2.0 psi is sufficient to securely grip a standard pretzel rod having a round cross-section. In addition, it has been found that a compression force as great as 25 psi will securely grip a standard pretzel rod without deforming, crushing or otherwise damaging the pretzel rod. Preferably, grommet 20 is configured to apply compression force of between about 5 psi to about 6 psi to more securely grip a standard pretzel rod product.

It will be further understood that the compression force applied for gripping the brittle product will depend in part on the specific properties of the elastomeric material (e.g., compressibility, elasticity and resilience), the size and dimensions of the grommet (e.g., wall thickness), and the amount of the transverse force exerted by the internal clamping mechanism. For example, a grommet according to the embodiment shown in FIGS. 3 and 4 formed of QM 122 food grade silicone material having a wall thickness ($W_{th}$) of 0.025 in. in the vicinity of a transverse force of approximately 8 lbs. exerted by the extractor internal clamping mechanism will result in a compression force of about 5 psi to 6 psi to securely grip a standard pretzel rod having a length of between about 5 inches to about 7 inches and a generally round cross-section having a circumference of between about ⅜ inch and about ½ inch.

Figure 3:
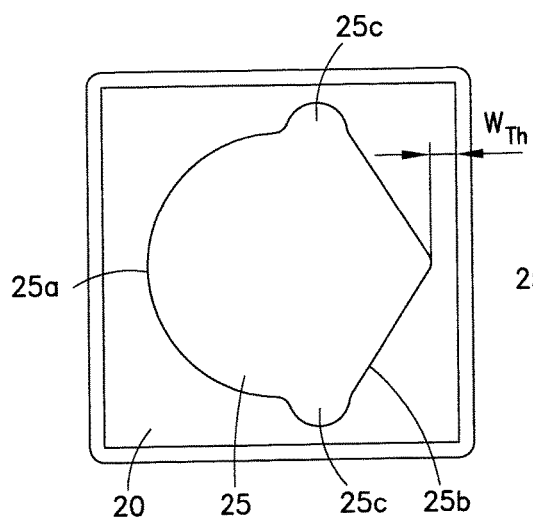
FIG. 3 is a plan view of an embodiment of an elastomeric grommet for the extractor assembly embodiment shown in FIG. 1.

As further shown with reference to FIG. 3, grommet 20 has an opening 25 dimensioned to receive the brittle product, and configured to distribute the transverse force exerted by the internal clamping mechanism in a manner to apply a compression force to the outside surface of the brittle product. Grommet 20 may be integrally formed within opening 15. Alternatively, grommet 20 may be removably coupled within opening 15 to allow for ease of replacement with a new grommet or substitution with a grommet having a different opening 25 shape, dimension and/or configuration.

Figure 4:
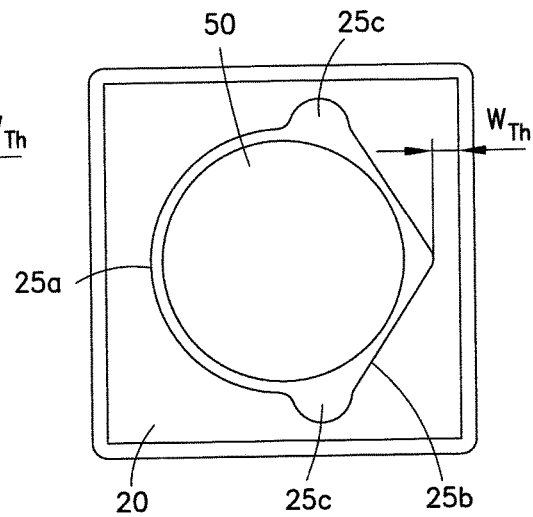
FIG. 4 is a plan view of the elastomeric grommet shown in FIG. 3 with a fragile or brittle biscuit, bread, cookie or candy product having a round cross-section.

In the embodiment shown in FIGS. 3 and 4, grommet opening 25 has a first surface 25a generally dimensioned to conform to the cross-sectional shape of the brittle product 50 when subjected to a transverse force. Grommet opening 25 further comprises a second surface 25b and two channels 25c. The second surface 25b is configured to contact and apply a compression force to only a portion of the adjacent surface of the brittle product when subjected to the transverse force exerted by the internal clamping mechanism so as to accommodate any imperfections or irregularities in the cross-sectional shape of the brittle product 50. Channels 25c do not contact the adjacent outside surface of the brittle product 50 when grommet 20 is subjected to the transverse force exerted by the internal clamping mechanism. Instead, channels 25c are designed to collapse and prevent the grommet from buckling and thereby enable first surface 25a and second surface 25b to contact and apply a gripping force to the outside surface of brittle product 50 when the grommet is subjected to the transverse force exerted by the internal clamping mechanism. The channels 25c are also designed to open and enable the grommet to revert to its original configuration to facilitate the release of the brittle product 50 when lever 30 moved to the open position and grommet 20 is not subjected to a transverse force exerted by the internal clamping mechanism. To this end, grommet 20 is generally configured to have channels 25c or low stress points oriented at positions perpendicular to the transverse force exerted on the grommet 20 by the internal clamping mechanism.

Figure 5:
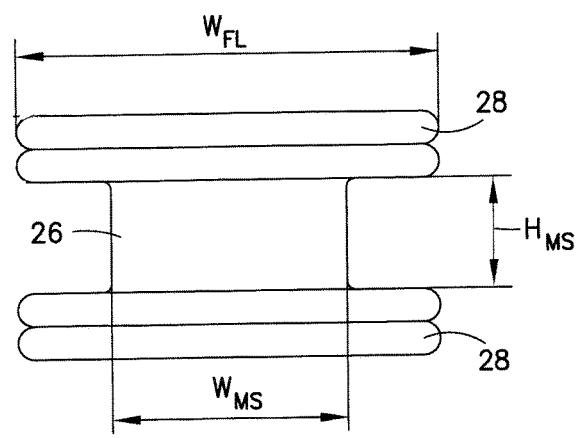
FIG. 5 is a side view of the elastomeric grommet shown in FIG. 3.
Figure 6:
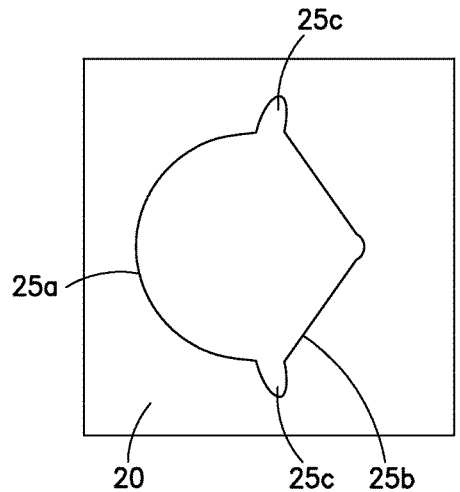
FIG. 6 is a plan view of an alternative embodiment of an elastomeric grommet for a brittle biscuit, bread, cookie or candy product having a round cross-section.
Figure 7:
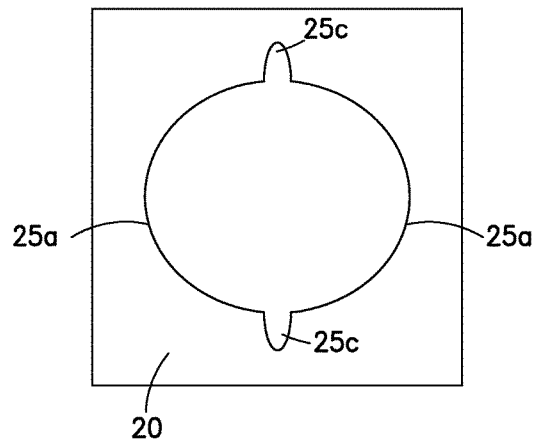
FIG. 7 is a plan view of another alternative embodiment of an elastomeric grommet for a brittle biscuit, bread, cookie or candy product having a round cross-section.
Figure 8:
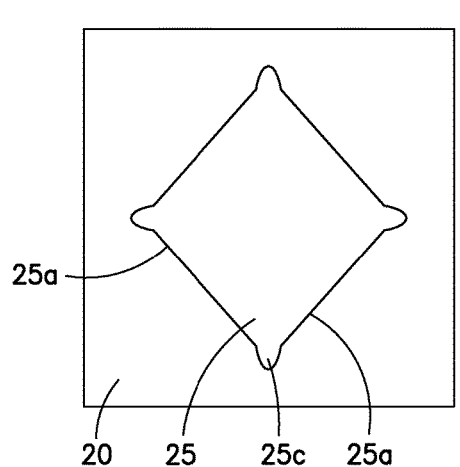
FIG. 8 is a plan view of an embodiment of an elastomeric grommet for a brittle biscuit, bread, cookie or candy product having a diamond-shaped cross-section.
Figure 9:
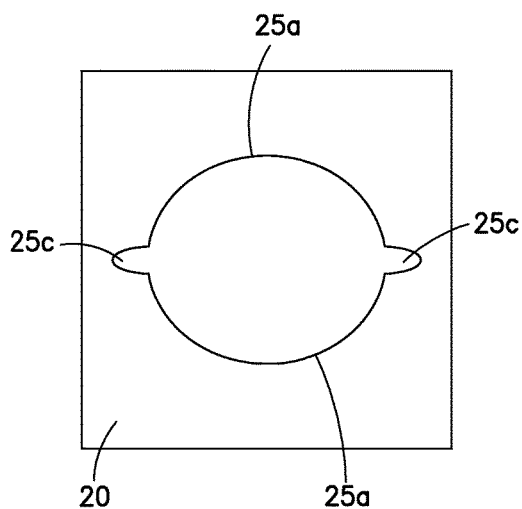
FIG. 9 is a plan view of an embodiment of an elastomeric grommet for a brittle biscuit, bread, cookie or candy product having an oval cross-section.
Figure 10:
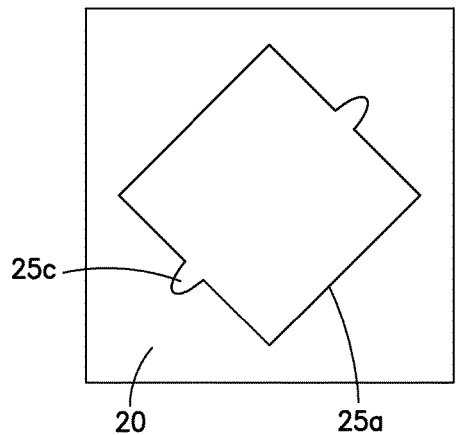
FIG. 10 is a plan view of an embodiment of an elastomeric grommet for a brittle biscuit, bread, cookie or candy product having a square cross-section.
Figure 11:
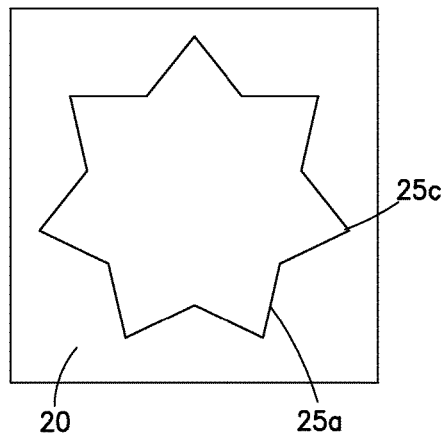
FIG. 11 is a plan view of an embodiment of an elastomeric grommet for a brittle biscuit, bread, cookie or candy product having a star-shaped cross-section.
Figure 12:
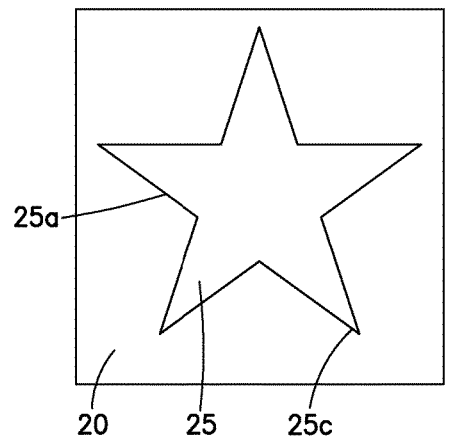
FIG. 12 is a plan view of an alternative embodiment of an elastomeric grommet for a brittle biscuit, bread, cookie or candy product having a star-shaped cross-section.
Figure 13:
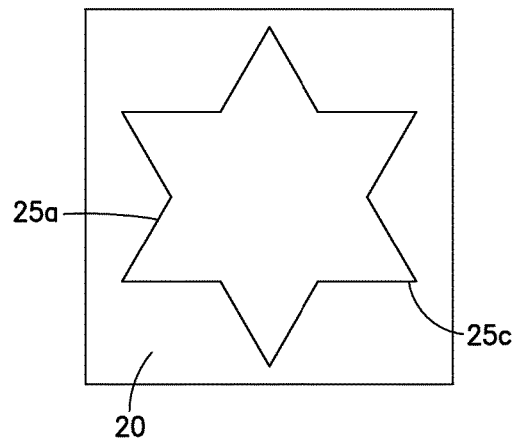
FIG. 13 is a plan view of another alternative embodiment of an elastomeric grommet for a brittle biscuit, bread, cookie or candy product having a star-shaped cross-section.

As shown in FIGS. 3 and 4, grommet opening 25, and particularly first surface 25a and portions of second surface 25b are configured to apply a compression force to securely grip a brittle product 50 having a round cross-section. In this instance, for example, the brittle product may be a pretzel rod, a bread stick, or a candy cane. As shown in FIG. 5, grommet 20 includes a middle section 26 disposed between opposing flanges 28. Grommet 20 is dimensioned to be received within opening 15 of extractor plate 10. Flanges 28 include a groove for receiving extractor plate 10. In the embodiment depicting in FIG. 5, flange 28 has a width $W_{FL}$ of approximately 1.5 in. and a height of approximately 0.27 in, and middle section 26 has a width $W_{MS}$ of approximately 0.95 in. and a height $H_{MS}$ of approximately 0.45 in.

It will be understood that grommet opening 25, and particularly first surface 25a, may have alternative configurations depending on the cross-sectional shape of the brittle product. Illustrative examples of different grommet embodiments with alternative cross-sectional openings 25 are shown in FIGS. 6-13.

FIG. 14 shows an embodiment of the present invention comprising an extractor assembly 1 utilized in connection with a plurality of mold cups filled with a confection product.

In operation, when the brittle product 50 is inserted into the grommet opening 25 and the lever 30 is moved to the closed position, a tab applies a transverse force to the side of grommet 20. With regard to grommet 20 shown in FIG. 4, the transverse force may be applied on the side of the grommet aligned with the point of second surface 25b of grommet opening 25. Alternatively, it will be understood that the transverse force may be applies to the side of the grommet 20 opposite the side aligned with the point of the second surface 25b of grommet opening 25. Application of such a transverse force will cause the grommet to deform and provide a gripping surface along grommet first surface 25a and portions of the second surface 25b. Channels 25c collapse slightly and do not provide a gripping surface with brittle product 50.

Figure 15A:
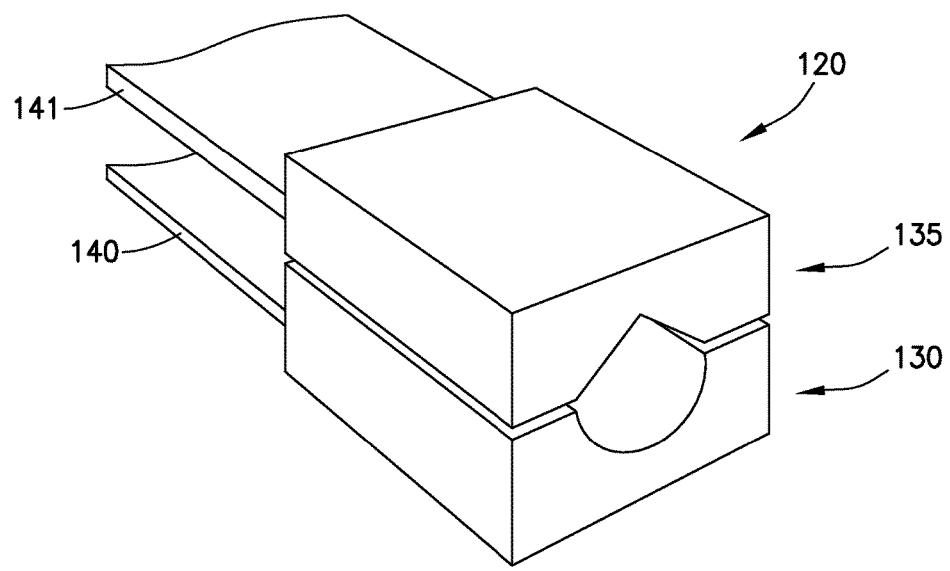
FIG. 15a is a perspective view of an embodiment of a grommet assembly in a closed position for the extractor assembly embodiment shown in FIG. 15.
Figure 15B:
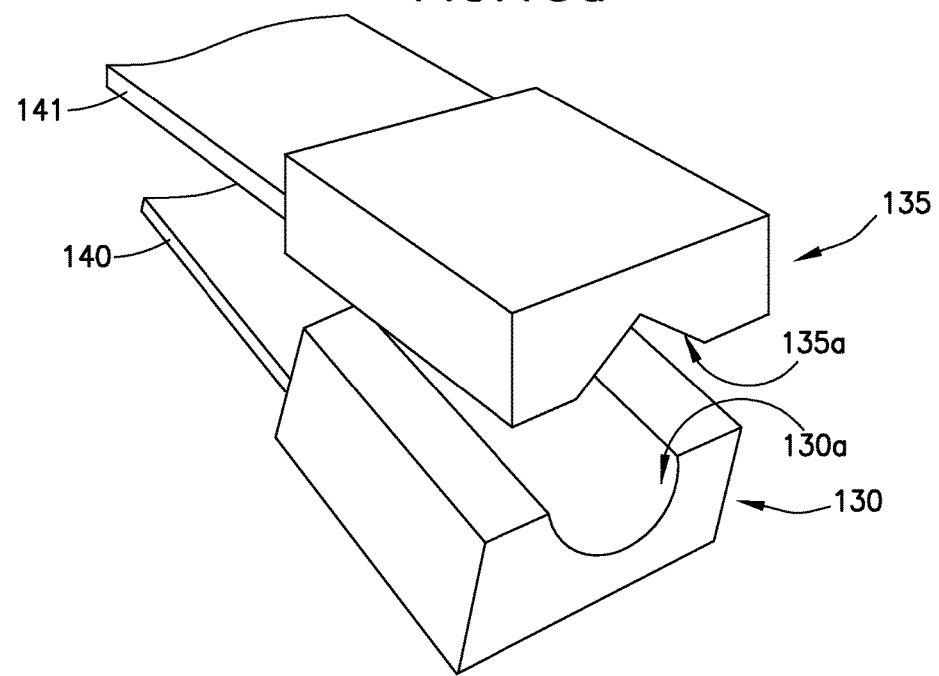
FIG. 15b is a perspective view of an embodiment of a grommet assembly in an open position for the extractor assembly embodiment shown in FIG. 15.

According to another embodiment, the present invention may be implemented in an automated production system such as a vitaline or versaline having various different extractor assembly configurations. For example, as shown in FIG. 15, grommet assemblies 120 may be implemented in an automatic extractor assembly 100 having a series of sets of lever arms 140, 141 that are separately movable between an open position and a closed position. With reference to FIGS. 15a and 15b, a grommet assembly 120 is disposed on the distal ends of each set of separately movable extractor lever arms 140, 141. Each grommet assembly 120 comprises a first section 130 having a surface 130a generally dimensioned to conform to the cross-sectional shape of the food product 150 and a second section 135 having a surface 135a configured to only contact and apply a compression force to certain portions of the adjacent outside surface of the food product 150 so as to be able to accommodate any irregularities or imperfections in the cross-sectional shape of food product 150. Each set of lever arms 140, 141 and respective grommet first sections 130 and section sections 135 is movable between an open position and a closed position. When the extractor lever arms are in the open position as illustrated in FIG. 15b, a food product may be received into surface 130a of grommet assembly 120. The lever arms 140, 141 may then be moved to the closed position as illustrated in FIG. 15a such that a compression force is applied by surface 130a of grommet first section 130 and surface 135a of grommet second section 135 to contact and securely engage the food product. As illustrated in FIG. 15, corresponding sections of neighboring grommet assemblies 120 may be linked together by a cross-bar member for purposes of stabilizing the alignment of each of the grommet assemblies 120.

Figure 16:
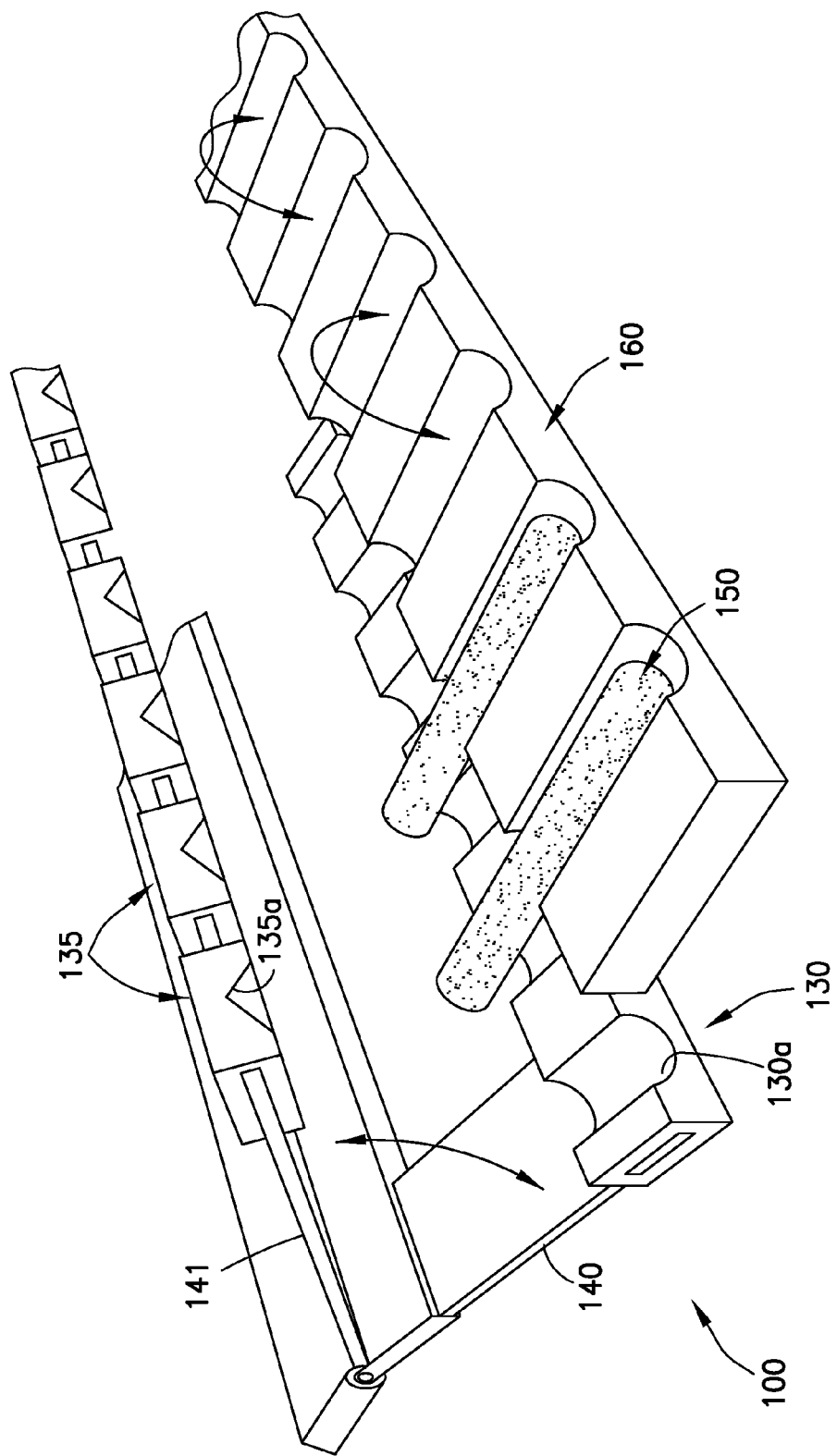
FIG. 16 is a perspective view of another embodiment of an extractor assembly for an automated production system according to the present invention.

By way of further example, as shown in FIG. 16, grommet assemblies 120 may be implemented in an automatic extractor assembly 100 having a row of grommet assemblies 120 designed to simultaneously receive and securely engage multiple food products. Each grommet assembly 120 comprises a first section 130 having a surface 130a generally dimensioned to conform to the cross-sectional shape of the food product 150. Each grommet assembly further comprises a second section 135 having a surface 135a configured to only contact and apply a compression force to certain portions of the adjacent outside surface of the food product 150 so as to be able to accommodate any irregularities or imperfections in the cross-sectional shape of food product 150. The sets of complimentary grommet first sections 130 and second sections 135 are disposed on the distal ends of extractor lever arms 140, 141, which are movable between an open position and a closed position. When the extractor lever arms are in the open position, food products may be received into surface 130a of each grommet assembly 120. The loading of the food products into surface 130a of each grommet assembly 120 may be achieved through the use a food product loader tray 160. After the food product is received in surface 130a of each grommet assembly, the lever arms 140, 141 may be moved to the closed position such that a compression force is applied by surface 130a of grommet first section 130 and surface 135a of grommet second section 135 to contact and securely engage the food product 150.

According to one aspect of the present invention, grommet sections 130, 135 having different shaped and/or dimensioned surfaces 130a, 135a may be coupled to the distal ends of lever arms 140, 141, respectively, to accommodate a plurality of different food products having varying cross-sectional shapes and/or dimensions. To this end, grommet sections 130, 135 may be removably coupled to the distal ends of lever arms 140, 141, respectively, to allow for the interchangeable use of grommet sections 130, 135 having different shaped and/or dimensioned surfaces 130a, 135a.

A number of variations and modifications of the embodiments disclosed herein fall within the scope of the present invention. For example, it will be understood that the automated production system may be configured to implement the single piece grommet 20 described above with reference to the manually operated extractor assembly. Similarly, it will be understood that the manually operated extractor assembly may be configured to implement the two-piece grommet assembly 120 described above with reference to the automated production system.

The foregoing detailed description has been presented for purposes of illustration and description. The foregoing is not intended to limit the disclosure to the embodiments disclosed herein. In the foregoing description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An elastomeric grommet having an aperture dimensioned to receive an object having a predefined cross-sectional shape, the elastomeric grommet comprising:
   a radially flexible body comprising:
   (a) an outer wall surface; and
   (b) an inner wall surface defined by the aperture and comprising:
      (1) a first inner wall portion having a first end and a second end, the first inner wall portion extending between the first and second ends and having a shape contoured to correspond to the pre-defined cross-sectional shape of the object and configured to engage an adjacent surface of the object;
      (2) a second inner wall portion having a first end and a second end and configured to engage at least of a portion of an adjacent surface of the object; and (3) a channel disposed between the first inner wall portion and the second inner wall portion, the channel having a mouth extending between an end of the first inner wall portion and an end of the second inner wall portion; wherein the radially flexible body is sufficiently rigid such that the aperture is configured to maintain a normally open configuration defined by the first inner wall portion, channel and second inner wall portion; and wherein the channel mouth is configured to compress when a transverse force is applied to the outer wall surface of the elastomeric grommet body such that the first inner wall portion and the second inner wall portion engage and apply a compression force to adjacent portions of the object received in the elastomeric grommet aperture.

2. The elastomeric grommet of claim 1 wherein the radially flexible body comprises an FDA-compliant food grade elastomeric material.

3. The elastomeric grommet of claim 1, wherein the first inner wall portion and the second inner wall portion are configured to apply a compression force of less than 25 psi to the object received in the elastomeric grommet aperture when a transverse force is applied to the outer wall surface of the elastomeric grommet body.

4. The elastomeric grommet of claim 1, wherein the first inner wall portion and the second inner wall portion are configured to apply a compression force of between about 1.5 psi to about 25 psi to the object received in the elastomeric grommet aperture when a transverse force is applied to the outer wall surface of the elastomeric grommet body.

5. The elastomeric grommet of claim 1, wherein the first inner wall portion and the second inner wall portion are configured to apply a compression force of between about 5 psi to about 6 psi to the object received in the elastomeric grommet aperture when a transverse force is applied to the outer wall surface of the elastomeric grommet body.

6. The elastomeric grommet of claim 1, wherein the object has a generally circular cross-sectional shape and the first inner wall portion has a generally semi-circular shape.

7. An extractor assembly for engaging and releasably retaining a food product having a pre-defined cross-sectional shape, the extractor assembly comprising:

(a) an elastomeric grommet assembly configured to form an aperture having an open position dimensioned to receive the food product and a closed position dimensioned to engage and releasably retain the food product, wherein the aperture comprises:

(1) a first inner wall surface having a shape contoured to correspond to the pre-defined cross-sectional shape of the food product and configured to engage an adjacent surface of the food product when the elastomeric grommet assembly aperture is in the closed position, and (2) a second inner wall surface having a first portion configured to engage an adjacent surface of the food product and a second portion configured to not engage an adjacent surface of the food product when the elastomeric grommet assembly aperture is in the closed position.

8. The extractor assembly of claim 7 further comprising:

(a) a first lever arm having proximal and distal ends and a second lever arm having proximal and distal ends, wherein the proximal ends of the first and second lever arms are pivotally coupled together such that the distal ends of the first and second lever arms are movable between a first position and a second position, and (b) the elastomeric grommet assembly comprising a first section having the first inner wall surface and a second section having the second inner wall surface, wherein the first section of the grommet assembly is coupled to the distal end of the first lever arm and the second section of the grommet assembly is coupled to the distal end of the second lever arm such that the first and second sections of the elastomeric grommet assembly are in the open position dimensioned to receive the food product when the first and second lever arms are in the first position and the first and second sections of the grommet assembly are in the closed position dimensioned to engage and releasably retain the food product when the first and second lever arms are in the second position.

* * * * *